United States Patent [19]

Rickelton

[11] Patent Number: 4,623,522
[45] Date of Patent: Nov. 18, 1986

[54] EXTRACTION OF SILVER AND PALLADIUM METALS FROM AQUEOUS SOLUTIONS USING TERTIARY PHOSPHINE SULFIDES

[75] Inventor: William A. Rickelton, Niagara Falls, Canada

[73] Assignee: American Cyanamid Company, Stamford, Conn.

[21] Appl. No.: 455,680

[22] Filed: Jan. 5, 1983

[51] Int. Cl.$^4$ .................. C01G 55/00; C01G 5/00
[52] U.S. Cl. .......................................... 423/22; 423/24; 75/101 BE
[58] Field of Search .............. 423/22, 24; 75/101 BE

[56] References Cited

U.S. PATENT DOCUMENTS 3,920,449 11/1975 Onoda et al. ..................... 423/22
4,278,640 7/1981 Allen et al. ....................... 423/24

OTHER PUBLICATIONS

Elliott et al., "Anal. Chimica Acta", vol. 33, 1965, pp. 237–244.
Cattrall et al., "J. Inorg. and Nuc. Chem.", vol. 40, 1978, pp. 687–690.

Primary Examiner—H. T. Carter
Attorney, Agent, or Firm—Frank M. Van Reit; Michael J. Kelly

[57] ABSTRACT

Silver or palladium metals are selectively extracted from aqueous sulfuric acid solution by contacting the solution with a water-immiscible organic solvent extraction solution comprising a tertiary phosphine sulfide compound; separating the resulting silver- or palladium-phosphine sulfide complex from the aqueous solution; and recovering the silver or palladium metal from the complex by suitable stripping means.

18 Claims, No Drawings

EXTRACTION OF SILVER AND PALLADIUM METALS FROM AQUEOUS SOLUTIONS USING TERTIARY PHOSPHINE SULFIDES

The present invention relates in general to hydrometallurgy. More particularly, it relates to a method for the recovery of silver and palladium metals from aqueous sulfate solutions and to a method for the selective separation of silver from aqueous sulfuric acid solutions containing zinc and copper using extractive techniques.

BACKGROUND OF THE INVENTION

The extraction of silver and palladium from aqueous solutions of hydrochloric acid and nitric acid by means of a water-immiscible organic solution of a tertiary phosphine sulfide is known in the literature; see, for example, Hitchcock et al, Anal. Chem. 35, 254 (1963), Elliott et al, Anal. Chem. Acta 33, 237–246 (1965), Blednor et al, 8b, Nauk Tr. Krasnyansk, Inst. Tsvet. Metal 4, 180–186 (1973), Cattrall et al, J. Inorg. Nucl. Chem. 40, 687–690 (1978) and Mitchell et al, J. Radioanal. Chem. 43, 371–380 (1978). The extraction of these metals from aqueous sulfuric acid is not reported. However, such extractions have a high degree of unpredictability. For example, it is known to extract iron from chloride solutions and uranium from nitrate solutions with tri-n-octylphosphine oxide, but neither metal is extracted from sulfate solution; see ONRL 61-2-19, Feb. 1961. Moreover, the separations reported do not relate to the recovery of metals from ore leachates, as would be practiced by the metal recovery industry. Finally, with common diluents, such as kerosene, precipitation of the complexed metal and collection thereof at the phase boundary can sometimes be a problem. Thus, there is not presently available a suitable economical method for the industrial recovery of silver or palladium from aqueous sulfate leach solutions.

DESCRIPTION OF THE INVENTION

The present invention provides an economical, industrially applicable method for the recovery of silver or palladium from aqueous sulfuric acid solutions. According to the invention, there is provided a method comprising contacting the metal-bearing sulfuric acid solution with a water-immiscible organic solvent extraction solution comprising a tertiary phosphine sulfide compound to form a tertiary phosphine sulfide-metal complex which ordinarily is soluble in the organic phase. Subsequently, the phases are separated; then the metal is removed from the complex by a suitable stripping agent. Alternatively, the metal-bearing sulfuric acid solution may be passed over or through a supported phosphine sulfide extractant. The phosphine sulfide-metal complex is then stripped from the support using a suitable stripping agent.

The present invention also provides an economical, industrially applicable method for the selective separation of silver from copper and zinc in sulfuric acid, silver-bearing ore leachates using similar solvent extraction or supported extraction methods employing tertiary phosphine sulfide extractants.

Finally, in accordance with the present invention, there is provided a method for stripping the phosphine sulfide-metal complex by treating the complex with an aqueous solution of an alkali metal or ammonium thiosulfate. The free metal, following the stripping procedure, is then recovered, e.g., by electrolysis, direct reduction, cementation, etc.

In carrying out the process of the invention, extractive techniques compatible with an extraction solution, as described in detail hereinafter, include, but are not limited to, liquid-liquid extraction using either mixer-settler or columns, such as the reciprocating plate extraction column, pulse columns or columns employing rotating impellers; alternatively, the metal-bearing sulfuric acid solutions be passed over or through packed beds of supported phosphine sulfides wherein the support is an inert material, such as diatomaceous earth, or a polymer, such as a styrene-divinylbenzene copolymer, the latter being more explicitly described in U.S. Pat. No. 3,960,762 to Krobel et al or in U.S. Pat. No. 4,224,415 to Meitzner et al; or, liquid membrane extraction, as described by Boch, Valint and Hayworth of Exxon Research and Engineering Company; and selective supported membrane extractions, as described by Obermayer, Nichols, Allen and Caron of the Moleculon Research Corporation, may also be used. A particularly useful method is to utilize a macroreticular resin-supported phosphine sulfide compound, as described in a commonly assigned, copending application, Ser. No. 429908, filed 9/30/82.

The active extractant compounds employed in the process of the invention to remove the silver or palladium metals from the sulfuric acid leach solutions are tertiary phosphine sulfide compounds:

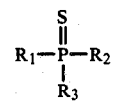

wherein $R_1$, $R_2$ and $R_3$, independently, represent alkyl of 2 or more carbon atoms, cycloalkyl, aryl, aralkyl and substituted aryl and aralkyl.

In liquid-liquid extraction, the pure phosphine sulfide may be used alone as the extractant, if it is a liquid; however, it is generally preferable to employ as the extractant a solution thereof in a water-immiscible organic solvent. Generally, such a solution will comprise from about 0.5 to 99 parts by volume of the tertiary phosphine sulfide compound and, correspondingly, 1 to 99.5 parts by volume of a suitable organic solvent. Most preferably, the extraction solution will comprise about 2 to 25 parts by volume of tertiary phosphine sulfide and 75 to 98 parts by volume of organic solvent.

Generally, the water-immiscible organic solvent used to make the extraction solution may vary widely. Suitable solvents include aromatic hydrocarbons, such as toluene and xylene; cyclohexane, naphtha, kerosene, and the like. A preferred solvent is an aliphatic or aromatic petroleum distillate composition of the kind available commercially as, for example, Kermac 470B from Kerr-McGee Corporation, Varsol DX-3641, from Exxon Co., Ashland 360, from Ashland Oil Co., or Solvesso 150 from Exxon Co.

Suitable tertiary phosphine sulfides useful in the present invention as the extractant include, but are not limited to, the following: triethylphosphine sulfide, tripropylphosphine sulfide, tributylphosphine sulfide, triisobutylphosphine sulfide, tripentylphosphine sulfide, trihexylphosphine sulfide, triheptylphosphine sulfide, trioctylphosphine sulfide, tridecylphosphine sulfide, tridodecylphosphine sulfide, trihexadecylphosphine sulfide, trioctadecylphosphine sulfide, trieicosylphosphine sulfide, methyldioctylphosphine sulfide, ethyldioctadecylphosphine sulfide, isobutyldioctylphosphine sulfide, butyldidecylphosphine sulfide, hexyldiisobutylphosphine sulfide, cyclohexyldibutylphosphine sulfide, dicyclohexyloctylphosphine sulfide, dicyclohexylmethylphosphine sulfide, dicyclooctylethylphosphine sulfide, benzyldicyclohexylphosphine sulfide, tricyclohexylphosphine sulfide, dioctylphenylphosphine sulfide, dihexyl(p-tolyl)phosphine sulfide, ethyldiphenylphosphine sulfide, triphenylphosphine sulfide, trinaphthylphosphine sulfide, cyclohexyldiphenylphosphine sulfide, dicyclopentyl(p-tolyl)phosphine sulfide, tribenzylphosphine sulfide, tris(p-tolyl)phosphine sulfide, tris(p-ethylphenyl)phosphine sulfide, tris(p-octylphenyl) phosphine sulfide, tris(2,3-dimethylphenyl)phosphine sulfide, tris(2,4-dimethylphenyl)phosphine sulfide, tris(2,5-dimethylphenyl)phosphine sulfide, tris(3,4-dimethylphenyl)phosphine sulfide, bis(p-tolyl)octylphosphine sulfide, dihexyl(2,4-dimethylphenyl)phosphine sulfide, tris(p-chlorophenyl)phosphine sulfide, tris(p-bromophenyl)phosphine sulfide, hexylbis(p-bromophenyl)phosphine sulfide, tris(3,5-dimethylphenyl)phosphine sulfide, octylbis(p-chlorophenyl)phosphine sulfide, 9-octyl-9-phosphabicyclo(3.3.1)nonane-9-sulfide, and the like. Generally, any tertiary phosphine sulfide having a low aqueous solubility, that is, at least 2 carbon atoms in the R group, is suitable. Preferred tertiary phosphine sulfides include triisobutylphosphine sulfide and tri-n-butylphosphine sulfide.

In some instances, the resulting metal-phosphine sulfide complex which forms in the extraction, for example in the extraction of silver with a phosphine sulfide containing alkyl groups of 4 carbon atoms or less, is not completely soluble in the extraction solution and may collect as a solid at the aqueous/organic boundary. This is potentially a troublesome problem in solvent extraction processes; however, in most cases, this can be overcome in a preferred embodiment of the invention by incorporating into the extraction solution a suitable organophosphoric acid compound which has the effect of solubilizing the complex in the extraction solution. In this regard, surprisingly, normally suitable phase modifiers, including tributylphosphate, trihexylphosphine oxide, trioctylphosphine oxide, isodecanol, tridecanol, and the like, do not appear to function effectively in the present invention.

Suitable organo-phosphoric acids are selected from the alkyl, cycloalkyl, aryl, substituted aryl, and aralkyl phosphoric acids. Representative examples include: di-n-hexylphosphoric acid, di-n-heptylphosphoric acid, di-n-ocylphosphoric acid, di-2-ethylhexylphosphoric acid, di-n-hexadecylphosphoric acid, di-n-octadecylphosphoric acid, n-butyl-n-hexadecylphosphoric acid, methyl-n-hexylphosphoric acid, n-butyl-2-ethylhexylphosphoric acid, n-octadecyl-2-ethylhexylphosphoric acid, diphenylphosphoric acid, phenyl-2-ethylhexylphosphoric acid, n-dodecyl-p-tolyl phosphoric acid, n-decylnaphthylphosphoric acid, 2-ethylhexyl-p-octylphenylphosphoric acid, di-p-octylphenylphosphoric acid, di-benzylphosphoric acid, benzyl-2-ethylhexylphosphoric acid, benzyl-octadecylphosphoric acid, dicyclohexylphosphoric acid, cyclohexyl-dodecylphosphoric acid, n-octyl dihydrogen phosphate, phenyl dihydrogen phosphate, benzyl dihydrogen phosphate, (p-chlorophenyl) dihydrogen phosphate, bis(2-ethylhexyl) dihydrogen diphosphate, octyl trihydrogen diphosphate, and the like. Generally, any organophosphoric acid having at least 6 carbon atoms in the hydrocarbon chain, with a maximum molecular weight of about 600, is suitable. In the preferred embodiment, the organophosphoric acid is a dialkyl($C_6$–$C_{18}$)phosphoric acid. The most preferred organophosphoric acid is the di-2-ethylhexylphosphoric acid (DEHP).

In those embodiments of the invention where an organophosphoric acid compound is present in the extraction solution, the preferred range is from about 1 to about 15 percent by volume of said organic solvent solution, with especially suitable results being obtained in the range of about 2.5 to 10 percent by volume. The ratio of tertiary phosphine sulfide to organophosphoric acid can vary over a broad range, but preferably, it will be within from about 2:1 to 1:5.

In carrying out the solvent extraction process of the invention, the metal bearing aqueous sulfuric acid solution is contacted, either by batch, continuously cocurrent or continuously counter-current, with the extraction solution. The ratio of aqueous phase (A) to organic phase (O) should be chosen to most effectively remove the desired metal from solution. A/O ratios of from about 1:20 to 20:1 are believed to be operable, depending on the specific separation. Phase contact is commonly achieved in devices called "mixer-settlers", although many other types of devices are available and suitable. In the mixer, one phase is dispersed within the other by stirring or some other appropriate form of agitation. The extractant then forms a complex with the metal which then reports to the organic phase of the two phase mixture. The dispersion then flows to the settler where the phases disengage under quiescent conditions. Generally, extraction is carried out at a temperature between about 0°–80° C., preferably between about 20°–70° C. The maximum temperature will be determined by the flash point of the organic solvent.

When the extraction process is conducted using supported extractants, for example, where the extractant is a phosphine sulfide encapsulated in a polymeric support, or is absorbed on an inert support such as diatomaceous earth, the metal-bearing solution is passed through or over the supported extractant. This may be accomplished in any convenient manner, such as by stirring the polymeric or inert material containing the extractant with the solution or, preferably, by passing the solution through the supported extractant using packed columns. The rate of flow of the solution through the polymeric supported extractant may be varied widely, as will be apparent to those skilled in the art.

The metal-loaded extractant solution is then stripped to recover the metal. This can be accomplished by any known convenient means, such as by contacting the solution with an aqueous solution of sodium cyanide or ammonia. Phase contact is achieved, as described above, using mixer-settlers.

However, in accordance with the present invention, it has been found that the metal-loaded extractant solution may be readily stripped of silver or palladium by contact with an aqueous solution of an alkali metal or ammonium thiosulfate, preferably sodium thiosulfate. This is readily accomplished using solvent extraction techniques, wherein the metal-loaded organic extractant solution obtained in the extraction process is contacted with an aqueous solution of the thiosulfate. The thiosulfate strips the metal from the phosphine sulfide-metal complex, whereupon the metal reports to the aqueous phase, from which it is recovered by one of the methods described hereinabove. When the extraction process is conducted using a supported extractant, the phosphine sulfide-metal complex, which is retained on the support, is stripped free of the metal by passing a solution of the thiosulfate through the column. The stripped metal-free solvent, containing the extractant phosphine sulfide compound, may then be pretreated and recycled to the extraction circuit for the treatment of incoming metal-bearing solution in accordance with conventional techniques.

The metal-bearing aqueous strip liquors may be treated by conventional electrowinning or concentration methods to recover the metal.

The following non-limiting examples further illustrate the present invention.

EXAMPLE 1

An aqueous solution of 0.97 gram per liter of silver, 6.06 grams per liter of zinc and 10.3 grams per liter of copper (all as sulfates) was contacted continuously counter-current in two stages at 24° C. with a solution of 25 grams per liter of triisobutylphosphine sulfide and 5% v/v di-2-ethylhexylphosphoric acid in Varsol DX-3641. The aqueous/organic ratio was 1. Following separation of the organic phase from the aqueous phase, the organic solution was stripped continuously counter-current in two stages with an aqueous solution of sodium thiosulfate; the A/O ratio was 1.

The raffinate contained less than 1 ppm silver, indicating greater than 99% recovery of silver.

Following stripping the strip liquor contained 969 ppm Ag, 12 ppm zinc and 6 ppm Cu. The separation factor (SF) for Ag/Zn was $0.5 \times 10^6$ and for Ag/Cu was $1.5 \times 10^6$.

This example illustrates the efficiency of the process of the invention in selectively separating silver from zinc and copper.

EXAMPLE 2

An aqueous solution containing 1 gram/liter of silver (as $Ag_2SO_4$) and 10 grams/liter of sulfuric acid was contacted with a solution of 0.2 mole of triisobutylphosphine sulfide (TIBPS) in:
(a) Varsol DX-3641
(b) Cyclohexane
(c) Solvesso 150

The extraction was conducted at 24° C. for 5 minutes using a ratio of aqueous/organic (A/O) of 1. A solid silverphosphine sulfide complex was produced which collected at the phase boundary. When the extractions were repeated using an extraction solution which additionally contained 5% by volume of di(2-ethylhexyl)-phosphoric acid (DEHPA), the resulting silver-phosphine sulfide complex dissolved in the organic phase. Analysis of the extracted aqueous solution for silver revealed that the silver was quantitatively extracted therefrom.

EXAMPLES 3–14

The procedure of Example 2 was following substituting as the phosphine sulfide:
(a) tri-n-octylphosphine sulfide (TOPS)
(b) tri-n-butylphosphine sulfide (TBPS)
(c) tri-n-hexylphosphine sulfide (THPS)
(d) tri-neohexylphosphine sulfide (TNHPS) Results are given in Table I.

TABLE I
Extraction of Silver from Sulfuric Acid Solution with Tertiary Phosphine Sulfide

| Example | Extractant | Water-Immiscible Solvent | Modifier | Precipitate Formed | Percent Ag Extracted |
|---|---|---|---|---|---|
| 3 | TOPS | Varsol DX-3641 | None | No | 100 |
| 4 | TOPS | Varsol DX-3641 | 5% DEHPA | No | 100 |
| 5 | TOPS | Cyclohexane | None | No | 97 |
| 6 | TOPS | Cyclohexane | 5% DEHPA | No | 100 |
| 7 | TOPS | Solvesso 150 | None | No | 99 |
| 8 | TOPS | Solvesso 150 | 5% DEHPA | No | 100 |
| 9 | TBPS | Varsol DX-3641 | None | Yes | (—)* |
| 10 | TBPS | Varsol DX-3641 | 5% DEHPA | No | 100 |
| 11 | THPS | Varsol DX-3641 | None | Yes | (—)* |
| 12 | THPS | Varsol DX-3641 | 5% DEHPA | No | 100 |
| 13 | TNHPS | Toluene | None | No | 90 |
| 14 | TNHPS | Toluene | 5% DEHPA | No | 100 |

*Silver was quantitatively extracted by the silver-phosphine sulfide complex but was not soluble in the organic extraction solution.

EXAMPLES 15–17

An aqueous solution was prepared containing 1.49 grams/liter of silver (as $Ag_2SO_4$) and 10 grams/liter of sulfuric acid. This solution was contacted for 5 minutes at 24° C. with a solution of triisobutylphosphine sulfide (TIBPS) and di(2-ethylhexyl)phosphoric acid (DEHPA) at various ratios in Varsol DX-3641. The aqueous/organic ratio was 1. Results are given in Table II.

TABLE II
Extraction of Silver from Sulfuric Acid Solutions with TIBS/DEHPA

| Example | Percent W/V TIBPS | Percent V/V DEHPA | Percent Ag Extracted |
|---|---|---|---|
| 15 | 2.5 | 2.5 | 100 |
| 16 | 2.5 | 5.0 | 100 |
| 17 | 2.5 | 10.0 | 100 |
| A* | 0 | 5.0 | 6 |

*Control

The data show that the mixture of TIBPS/DEHPA is an excellent extractant for silver and that DEHPA is not a major extractant.

EXAMPLE 18

Triisobutylphosphine sulfide (TIBPS), 100 grams, was dissolved in a minimum amount of petroleum ether and the resulting solution was sprayed onto approximately 150 grams of 3 mm glass beads. The petroleum ether was evaporated, leaving the beads coated with TIBPS. Approximately 125 grams of the coated beads was transferred to a Jones Reductor; total bed volume was 120 ml, porosity was about 62.5%, surface area about 905 cm².

An aqueous solution containing 44 micrograms of silver/ml and 5 grams/liter of sulfuric acid was passed through the column 10 times. After the tenth pass, the solution was analyzed for silver. None was found, indicating that silver was quantitatively removed from the solution.

EXAMPLE 19

The procedure of Example 18 was repeated except that the column was charged with 22.3 grams (100 ml bulk volume) of 80/100-mesh Chemisorb W (diatomaceous earth) having absorbed thereon 2.23 grams (10% by weight) of TIBPS. After one pass of the 50 ml aliquot of the aqueous solution of Example 19, no silver was detected therein.

EXAMPLE 20

Triisobutylphosphine sulfide (TIBPS, 6 grams) and tri-n-butylphosphine sulfide (TNBPS, 5 grams) were dissolved in 150 ml of pentane. The resulting solution was slurried with 33 grams of diatomaceous earth (Gas-Chrom 60/80-mesh, Applied Science Laboratories, Inc.) and the solvent stripped in vacuo from room temperature to about 90° C. There was obtained 44.1 grams of supported liquid phosphine sulfide mixture.

A column 253×14.5 mm was packed with 20 grams of the above supported phosphine sulfide (about 40 ml bed volume). An aqueous solution containing 39 ppm of Ag⁺ as sulfate (pH 5.5) was prepared and 150 ml was passed through the column once during 53 minutes (rate is about 3 bed volumes/hr). No silver was detected using an atomic absorption method sensitive to 0.5 ppm of Ag.

A second solution containing 1050 ppm of silver was prepared and 475 ml of the solution was passed through the column once over a period of 5 hours, at a rate of 2 bed volumes/hr. After one pass, the last 87 ml of solution contained 6 ppm of silver.

This example illustrates the preparation and use of a liquid phosphine sulfide mixture wherein one of the components is a solid. Thus, TIBPS melts at 59° C.; TNBPS is a liquid. A mixture of 55% TIBPS/45% TNBPS melts at 22° C. and a mixture of 60% TIBPS/40% TNBPS melts at 27° C. The liquid mixture has the advantage of stable physical attachment to the support compared with TIBPS.

EXAMPLE 21

A solution of 2.5% triisobutylphosphine sulfide and 5% di(2-ethylhexyl)phosphoric acid in Varsol DX-3641 was brought into contact with an equal volume of an aqueous solution containing 0.96 gram/liter Ag⁺ (as Ag₂SO₄) and 10 grams/liter of sulfuric acid. After 5 minutes contact time at 24° C., the silver was found to be quantitatively extracted. The silver-loaded extraction solution was contacted under the same conditions with a solution containing 240 grams/liter of sodium thiosulfate. Analysis showed that 99% of the silver was stripped from the silver-loaded extraction solution.

EXAMPLE 22

Palladium sulfate (0.0566 gram) was stirred for one hour in 50 ml water containing one gram of concentrated sulfuric acid. The insoluble material was filtered and the filtrate was analyzed for palladium. The solution contained 253 ppm palladium as sulfate at a pH of 0.8.

Twenty grams of the above solution was slurried for 6½ hours with 3 grams of the supported phosphine sulfide of Example 20. The solution was filtered away from the support and analyzed for palladium. No detectable palladium was found (less than 1 ppm).

In a control experiment, 20 grams of the solution was slurried with 2.25 grams of the diatomaceous earth used as the support above. After 6½ hours stirring, the solution was filtered from the support and analyzed for palladium. The solution was found to contain the original 253 ppm palladium.

EXAMPLE 23

The procedure of Example 18 is repeated except that the column is charged with 25 grams of styrene-divinyl benzene copolymer beads having encapsulated thereon 2.5 grams of triisobutylphosphine sulfide. Similar results are obtained.

What is claimed is:

1. A process for the extraction of silver or palladium metal values from an aqueous solution of sulfuric acid, said process comprising: (1) contacting said solution with a tertiary phosphine sulfide compound represented by the formula:

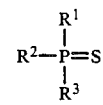

wherein R¹, R² and R³ are each independently selected from alkyl of at least two carbon atoms, cycloalkyl, aryl, aralkyl, substituted aryl and substituted aralkyl; (2) separating the resulting tertiary phosphine sulfide-silver or tertiary phosphine sulfide-palladium complex therefrom; and (3) recovering said silver or palladium metal values from said complex with a suitable stripping agent.

2. A process as defined in claim 1 wherein said tertiary phosphine sulfide compound is in solution in a water-immiscible hydrocarbon solvent.

3. A process as defined in claim 2 wherein said hydrocarbon solvent is an aliphatic or aromatic petroleum distillate composition.

4. A process as defined in claim 2 or 3 wherein said phosphine sulfide compound comprises from about 2 to about 25 percent by weight of said solution.

5. A process as defined in claim 2 or 3 wherein said solution additionally comprises an organophosphoric acid compound in an amount of from about 1 to 15 percent by volume of said solution and wherein the ratio of phosphine sulfide to organophosphoric acid in said solution is in the range of from about 2:1 to about 1:5.

6. A process as defined in claim 4 wherein said organophosphoric acid compound is di(2-ethylhexyl) phosphoric acid.

7. A process as defined in claim 1 wherein said tertiary phosphine sulfide compound is triisobutyl phosphine sulfide.

8. A process as defined in claim 1 wherein said tertiary phosphine sulfide compound is tri-n-butyl phosphine sulfide.

9. A process as defined in claim 1 wherein said tertiary phosphine sulfide compound is a liquid mixture of triisobutylphosphine sulfide and tri-n-butylphosphine sulfide.

10. A process as defined in claim 9 wherein said triisobutylphosphine sulfide comprises from about 50 to 60 percent by weight of said mixture.

11. A process for the selective separation of silver from an aqueous sulfuric acid solution containing copper and zinc metals, said process comprising: (1) contacting said solution with a water-immiscible hydrocarbon solvent solution of a tertiary phosphine sulfide compound represented by the formula:

(2) separating the organic solution, containing a phosphine sulfide-silver complex, from the aqueous solution; and (3) recovering the silver metal values from said complex by contacting said organic solution with a suitable stripping agent.

12. A process as defined in claim 11 wherein said hydrocarbon solvent is an aliphatic or aromatic petroleum distillate composition.

13. A process as defined in claim 11 or 12 wherein said phosphine sulfide compound comprises from about 2 to about 25 percent by weight of said solution.

14. A process as defined in claim 11 or 12 wherein said solution additionally comprises an organophosphoric acid compound in an amount of from about 1 to 15 percent by volume of said solution and wherein the ratio of phosphine sulfide to organophosphoric acid in said solution is in the range of from about 2:1 to 1:5.

15. A process as defined in claim 14 wherein said organophosphoric acid is di(2-ethylhexyl) phosphoric acid.

16. A process as defined in claim 11 wherein said tertiary phosphine sulfide compound is triisobutyl phosphine sulfide.

17. A process as defined in claim 1 wherein said tertiary phosphine sulfide compound is encapsulated in a solid inert support material.

18. A process as defined in claim 17 wherein said solid inert support material is a styrene-divinylbenzene copolymer.

* * * * *